US009815913B2

(12) United States Patent
Costin et al.

(10) Patent No.: US 9,815,913 B2
(45) Date of Patent: Nov. 14, 2017

(54) PROCESS FOR CONTINUOUS SOLUTION POLYMERIZATION

(71) Applicant: ExxonMobil Chemical Patents Inc., Baytown, TX (US)

(72) Inventors: Quintin P. W. Costin, Baton Rouge, LA (US); Philip M. Duvall, Baton Rouge, LA (US); Jay L. Reimers, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 46 days.

(21) Appl. No.: 15/144,493

(22) Filed: May 2, 2016

(65) Prior Publication Data
US 2016/0362506 A1 Dec. 15, 2016

Related U.S. Application Data

(60) Provisional application No. 62/175,893, filed on Jun. 15, 2015.

(51) Int. Cl.
*C08F 2/04* (2006.01)
*C08F 210/18* (2006.01)
(Continued)

(52) U.S. Cl.
CPC .............. *C08F 2/04* (2013.01); *C08F 6/003* (2013.01); *C08F 6/12* (2013.01); *C08F 210/16* (2013.01);
(Continued)

(58) Field of Classification Search
CPC .......... C08F 2/04; C08F 6/12; C08F 2400/02; C08F 210/16; C08F 210/18
See application file for complete search history.

(56) References Cited

U.S. PATENT DOCUMENTS 3,496,135 A * 2/1970 Caywood, Jr. ............ C08F 6/12
524/113
3,553,156 A 1/1971 Anolick et al.
(Continued)

FOREIGN PATENT DOCUMENTS

WO 1994/00500 1/1994
WO 2011/008955 1/2011
(Continued)

OTHER PUBLICATIONS

Michelson, "A Simple Method for Calculation of Approximate Phase Boundaries," *Fluid Phase Equilibria*, 1994, vol. 98, pp. 1-11.

*Primary Examiner* — Brieann R Johnston
(74) *Attorney, Agent, or Firm* — Darryl M. Tyus (57) ABSTRACT

Described herein are methods for continuous solution polymerization. The method may comprise polymerizing one or more monomers and comonomers in the presence of a solvent in a polymerization reactor to produce a polymer solution; determining the composition of the polymer solution exiting the polymerization reactor in an on-line fashion; determining at least one of the critical pressure or critical temperature; comparing the critical pressure and/or critical temperature to the actual temperature of the polymer solution and the actual pressure of the polymer solution; heating or cooling the polymer solution to a temperature within 50° C. of the critical temperature; and passing the polymer solution through a pressure letdown valve into a liquid-liquid separator, where the pressure of the polymer solution is reduced or raised to a pressure within 50 psig of the critical pressure to induce a separation of the polymer solution into two liquid phases.

14 Claims, 2 Drawing Sheets

(51) Int. Cl.
*C08F 210/16* (2006.01)
*C08F 6/00* (2006.01)
*C08F 6/12* (2006.01)

(52) U.S. Cl.
CPC ........ *C08F 210/18* (2013.01); *C08F 2400/02* (2013.01)

(56) References Cited

U.S. PATENT DOCUMENTS

| | | | | |
|---|---|---|---|---|
| 3,726,843 | A * | 4/1973 | Slocum et al. | C08F 6/12 528/481 |
| 4,857,633 | A * | 8/1989 | Irani | C08F 6/12 528/491 |
| 4,946,940 | A * | 8/1990 | Guckes | C08F 6/12 208/311 |
| 5,264,536 | A | 11/1993 | Radosz | |
| 6,204,344 | B1 | 3/2001 | Kendrick et al. | |
| 6,881,800 | B2 | 4/2005 | Friedersdorf | |
| 7,163,989 | B2 | 1/2007 | Friedersdorf | |
| 7,650,930 | B2 | 1/2010 | Cheluget et al. | |
| 8,916,659 | B1 | 12/2014 | Costin et al. | |
| 9,700,814 | B2 * | 7/2017 | Hypolite | B01D 17/0208 |
| 2009/0259005 | A1 | 10/2009 | Kiss et al. | |
| 2012/0088893 | A1 | 4/2012 | Jog et al. | |
| 2016/0282251 | A1 * | 9/2016 | Wang | C08F 6/003 |

FOREIGN PATENT DOCUMENTS

| | | |
|---|---|---|
| WO | 2013/134041 | 9/2013 |
| WO | 2013/137962 | 9/2013 |
| WO | 2013/169357 | 11/2013 |

* cited by examiner

PROCESS FOR CONTINUOUS SOLUTION POLYMERIZATION

PRIORITY

This invention claims priority to and the benefit of U.S. Ser. No. 62/175,893, filed on Jun. 15, 2015.

FIELD OF THE INVENTION

Provided herein are continuous solution polymerization processes, including methods for improving the separation and recovery of the polymer product from the polymerization reaction solution.

BACKGROUND OF THE INVENTION

Continuous solution polymerization processes generally involve the addition of a catalyst to a monomer and solvent mixture. For example, PCT Publication WO 94/00500 describes a solution polymerization process using a metallocene catalyst in continuous stirred tank reactors, which may be parallel or arranged in series, to make a variety of polymer products. Upon reaction of the catalyst and monomers, the formed polymer is dissolved in the polymerization medium or solvent, often along with catalyst and unreacted monomer. Often the solution exiting the polymerization reactor has a relatively low polymer concentration, such as from about 3 wt % to 30 wt %. The product mixture is then passed to polymer concentration and finishing stages to separate the solvent and unreacted monomer from the mixture such that the desired polymer can be recovered in a usable form. The separated solvent and monomer can then later be recycled back to the reactor for re-use.

A polymer solution can exhibit the Lower Critical Solution Temperature (LCST) phenomenon whereby the polymer solution separates into a polymer-rich liquid phase and a polymer-lean liquid phase above a certain temperature. Typically, this separation method involves heating the polymer solution under high pressure, followed by reducing the pressure to a point where two phases (polymer-rich phase and polymer-lean phase) are formed. Of the two phases that are formed, the polymer-lean phase is rich in solvent and contains most of the unreacted monomer and contains very little polymer, whereas the rich phase is polymer rich. The denser polymer-rich phase settles to the bottom of the vessel where it is pressure fed to downstream equipment where the remaining solvent is removed. The solvent-rich phase (polymer-lean phase) overflows out the top of the separation vessel where it is cooled and recycled back to the polymerization reactor for re-use.

If the LCST separation is not carried out at proper operating conditions, there can be incomplete separation of the polymer from the polymer-lean phase. This can lead to polymer product being carried overhead in the lean phase, where it can plate out and detrimentally foul equipment in the recycle solvent stream. Therefore, there remains a need for methods to optimize the recovery of polymer from a solution polymerization process that can minimize or reduce the potential for recycle solvent fouling.

Additional background references include U.S. Pat. Nos. 3,553,156; 3,726,843; 5,264,536; 6,204,344; 6,881,800; 7,163,989; 7,650,930; and 8,916,659; U.S. Patent Application Publication No. 2012/0088893; PCT Publications WO 2011/008955; WO 2013/134041; WO 2013/137962; WO 2013/169357; and Michelsen, M., "A Simple Method for Calculation of Approximate Phase Boundaries", *Fluid Phase Equilibria*, 98: 1-11 (1994).

SUMMARY OF THE INVENTION

Described herein are methods for continuous solution polymerization. The method may comprise (a) polymerizing one or more monomers and comonomers in the presence of a solvent in a polymerization reactor to produce a polymer solution comprising solvent, polymer, and unreacted monomer and comonomer; (b) determining the composition of the polymer solution exiting the polymerization reactor in an on-line fashion; (c) determining at least one of the critical pressure or critical temperature; (d) comparing the critical pressure and/or critical temperature to the actual temperature of the polymer solution and the actual pressure of the polymer solution; (e) heating or cooling the polymer solution to a temperature within 50° C. of the critical temperature; (f) passing the polymer solution through a pressure letdown valve into a liquid-liquid separator, where the pressure of the polymer solution is reduced or raised to a pressure within 50 psig of the critical pressure to induce a separation of the polymer solution into two liquid phases, a polymer-rich phase and a polymer-lean phase; (g) recovering the polymer-rich phase from the liquid-liquid separator; and (h) devolatizing the polymer-rich phase to obtain polymer.

The methods described herein allow for more efficient separation of the polymer solution, which in turn can reduce the amount of polymer carryover into the polymer-lean phase of the separation and decrease recycle fouling.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

As used herein, a "polymer" may be used to refer to homopolymers, copolymers, interpolymers, terpolymers, etc. When a polymer is referred to as comprising a monomer, the monomer is present in the polymer in the polymerized form of the monomer or in the derivative form of the monomer. Thus, when a polymer is said to comprise a certain percentage, wt %, of a monomer, that percentage of monomer is based on the total amount of monomer units in all the polymer components of the composition or blend.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers.

As used herein, "plastomer" shall mean ethylene based copolymers having a density in the range of about 0.85 to 0.915 g/cm3 ASTM D 4703 Method B and ASTM D 1505. Plastomers described herein include copolymers of ethylene derived units and higher α-olefin derived units such as propylene, 1-butene, 1-hexene, and 1-octene.

As used herein, the term "ethylene-based polymer(s)" refers to polymers containing at least about 50 wt % ethylene-derived units.

As used herein, the term "propylene-based polymer(s)" refers to polymers containing at least about 50 wt % propylene-derived units.

As used herein, by "continuous" is meant a system that operates (or is intended to operate) without interruption or cessation. For example, a continuous process to produce a polymer would be one where the reactants are continually introduced into one or more reactors and polymer product is continually withdrawn.

As used herein, "solution polymerization" refers to a polymerization process in which the polymer is dissolved in a liquid polymerization system, such as an inert solvent or monomer(s) or their blends. Solution polymerization comprises a homogeneous liquid polymerization system in the reactor. The temperature of a liquid polymerization system is below its supercritical or pseudo supercritical temperature, thus, solution polymerizations are performed below the supercritical temperature and/or pressure of the system. Conventional solution polymerization processes typically operate with more than 65 wt % inert solvent present in the polymerization system at pressures below 13 MPa (1885 psi) and temperatures between 40 and 160° C.

The expression "on-line" generation of data (or performance of an operation) during a reaction denotes generation of the data (or performance of the operation) sufficiently rapidly so that the data (or result of the operation) is available essentially instantaneously or sometime thereafter for use during the reaction process. The expression "generation of data in an on-line fashion" during a reaction is used synonymously with the expression on-line generation of data during a reaction. Generation of data from a laboratory test (on at least one substance employed or generated in the reaction) is not considered "on-line generation" of data during the reaction, if the laboratory test consumes so much time that parameters of the reaction may change significantly during the time required to conduct the test. However, it is contemplated that on-line generation of data may include the use of a previously generated database that may have been generated in any of a variety of ways including utilizing time-consuming laboratory tests.

Continuous Solution Polymerization Plant

The separation processes described herein may be used to separate any formed polymer that is dissolved in a polymerization medium or solvent. However, the processes may be particularly useful in conjunction with homogenous, continuous solution polymerization processes such as those described in U.S. Patent Application No. 2004/002146, U.S. Pat. Nos. 6,881,800; 7,803,876; 8,013,069; and 8,026,323, and PCT Publications WO 2011/087729; WO 2011/087730; and WO 2011/087731, the disclosures of which are incorporated herein by reference. In some embodiments, the polymer separation processes described herein may be preferably utilized with a continuous solution polymerization plant as described with reference to FIG. 1.

Figure 1:
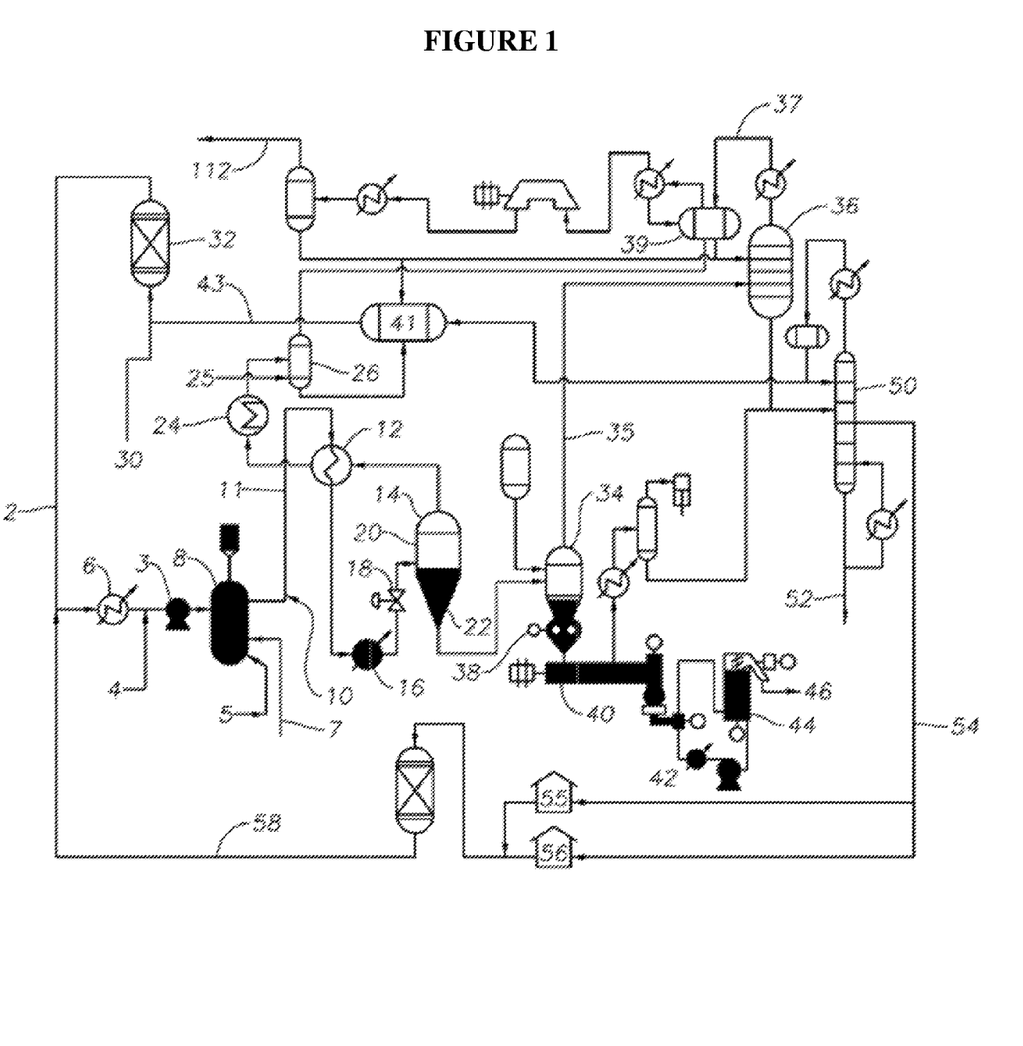
FIG. 1 shows a schematic of a solution polymerization plant.

With reference to FIG. 1, a plant for continuous solution polymerization may be arranged as follows. A feed for polymerization is passed through conduit (2), a chiller or cooler (6), a centrifugal pump (3), into a polymerization reactor (8). The feed may contain: A) a solvent, such as isohexane, B) monomer, generally the predominant monomer is ethylene or propylene, and optionally C) comonomer which may be any copolymerizable alpha-olefin, and optionally D) a diene or other polyene or cyclic copolymerizable material. The feed is passed through a chiller or cooler (6) in which the feed is optionally chilled to a low temperature for subsequent adiabatic polymerization in a continuous stirred tank reactor (8). In some embodiments, two or more continuous stirred tank reactors may be operated in series or parallel (however, for simplicity, only one reactor is depicted in FIG. 1). Activator and metallocene catalyst may be premixed and added through conduits (5) and/or (7) to one or more reactors (8). A scavenger, such as an alkyl aluminum, for example tri-isobutyl aluminum or tri-n-octyl aluminum, may be added through conduit (4) to minimize the impact of poisons in the feed and in the reactor on the catalyst activity.

To complement the molecular weight control provided by controlling the polymerization temperature, hydrogen may be added to one or both reactors (8) through conduits (not shown).

The polymer-containing polymerization mixture, which emerges from the reactors (8) through a conduit (11), may first be treated with a catalyst killer, for example with water and/or methanol, added at (10). In some embodiments, the catalyst killer may be introduced to the system in a molecular solution in isohexane solvent to terminate the polymerization reaction.

A heat exchanger (12) may be arranged as part of a heat integrating arrangement and heated by a polymer-lean phase emerging from an upper layer (20) in a liquid phase separator (14), and provide an initial increase in the temperature of the polymer-containing polymerization reactor effluent in the conduit (11). A trim heat exchanger (16), which may be heated by steam, hot oil or other high temperature fluid, further increases the temperature of the polymer-containing polymerization reactor effluent to a level suitable for liquid phase separation. The solution then passes through a let-down valve (18) where a pressure drop is created which causes the separation of the polymer-containing polymerization reactor effluent into the polymer-lean phase (20) and a polymer-rich phase (22).

The density of the polymer-rich phase may be at least 40 kg/m$^3$, or at least 50 kg/m$^3$, or at least 60 kg/m$^3$ higher than the density of the polymer-lean phase, thus allowing gravity settling of the polymer-rich phase in the liquid-liquid separator. The polymer-lean phase may have a residence of time of at least 5 minutes, or at least 10 minutes within the liquid-liquid separator. The polymer-rich phase may have a residence time of at least 10 minutes, or at least 15 minutes, or at least 20 minutes within the liquid-liquid separator.

In some embodiments, the liquid-liquid separator may be designed to have a conical shaped bottom to enhance the drainage of the polymer-rich phase. In some embodiments, the vessel walls of the liquid-liquid separator may be heated (such as via a steam jacket) to further enhance the separation of the phases and to reduce the viscosity of the boundary between the two phases.

The interface between the polymer-rich phase and the polymer-lean phase in the liquid-liquid separator may be detected by a sonic detector or by nuclear-density gauges. In embodiment where nuclear-density gauges are utilized, there may be an array of radiation sources deployed inside an internal pipe well that runs parallel to the wall of the separator, and an array of detectors deployed outside the vessel along the wall radially in-line with the radiation sources. The radiation sources may be partially shielded in such a way that as much of the radiation is directed towards the detector with which it is paired. The pairings may be horizontally aligned, but may also have a staggered alignment such that a radiation source is aimed at a detector that is positionally above or below the detector at which it is aimed.

The lean phase (20), after being cooled by the heat exchanger (12), may be cooled further by a cooling device (24), and pass through a surge tank (26) adapted for stripping out containments, such as hydrogen. Fresh monomer or comonomer may be added through conduit (25) and used as stripping vapor in the surge tank (26). The cooled lean phase may pass to collector (41) and then through conduit (43), and may be passed to dryer (32). Fresh feed of solvent and monomer (30) may be added to conduit (43) to provide the desired concentrations for the polymerization reaction. The dryer (32) may be used to remove any unreacted methanol used as the catalyst killer or other containments present in the fresh feed supplied or any impurity in the recycled solvent and monomer. The recycle feed from the dryer (32) may then be passed through conduit (2) back to the polymerization reactor (8).

The vapor from the conduit at the top of the surge tank (26) may be routed to a reflux drum (39) of tower (36). The vapor may be processed to recover valuable components, such as monomers such as ethylene and propylene, by fractionating tower (36) and its overhead vapor compression/condensation system. The recovered components may be recycled through conduit (43) to the inlet side of the drier (32). Alternatively, excess components may be vented or flared (112).

Returning to the liquid phase separator (14), the concentrated polymer-rich phase (22) may be passed to a low-pressure separator (34) where evaporated solvent and monomer are separated from the more concentrated polymer solution emerging from the liquid phase separator (14).

The evaporated solvent and monomer phase may be passed through conduit (35) in a vapor phase to the purification/fractionation tower (36) which may operate by distillation to separate a light fraction of the highly volatile solvent and unreacted ethylene and propylene from the heavier less volatile components such as hexane and any toluene used to dissolve catalyst or activator and unreacted diene type comonomers.

A gear pump (38) may convey the concentrated polymer in the low-pressure separator (34) to a vacuum devolatilizing extruder or mixer (40), where again a vapor phase is drawn off for purification, condensed and then pumped to a purification tower (50). The vacuum devolatizer may be as described in PCT Publication WO 2011/087730. A heavy fraction of toluene used as catalyst solvent and any comonomers used are recovered by this purification tower (50). Recovered comonomer can be recycled through outlet (54), and in some embodiments excess comonomer may be stored in separate storage vessels (55), (56). The recycled comonomer can then be reintroduced to the polymerization reactors via conduit (58).

The polymer melt emerging from the vacuum devolatilizing extruder or mixer (40) can then be pelletized in an underwater pelletizer, fed with water chilled at (42), washed and spun dried at (44) to form pellets suitable for bagging or baling at (46).

The vapor from the devolatilizer (40) may be treated to recover and recycle the solvent. In some embodiments, the vapors may pass through a wash tower, a refrigerated heat exchanger and then through a series of compressors and pumps.

Some of the equipment pieces described above may contain external jacketing for the circulation of heating or cooling fluids. The equipment may also contain a central shaft or adjacent shafts that are used to convey and/or agitate the polymer solution or polymer melt in the equipment. Metallic protuberances may also be provided along the barrel walls, such as breaker bars or other stationary elements that aid in the mixing, conveying, and/or heating or cooling of the contents. The stationary metallic protuberances and/or moving elements attached to the shafts may crack or break due to fatigue or interferences present within the equipment. In some embodiments, the equipment may have drilled holes that are flooded with pressurized nitrogen or other inert gas in the stationary and/or moving parts of the machinery. Pressure detectors may then be used to monitor the equipment, with decreases in the pressure of the nitrogen indicating a breakage or crack in the equipment. Alternatively, the flow of the inert gas may be monitored with a flow metering device. In some embodiments, helium or another inert component which is not usually present in the apparatus, may be used to pressurize the apertures within the stationary and/or moving parts of the machinery. In such embodiments, the concentration of helium can then be measured by a helium analyzer in the stream leaving the equipment. The presence of helium in the stream would then indicate a break or crack in the machinery.

Polymerization of Different Polymers

The operation of the plant of FIG. 1 is further illustrated with reference to Table 1. Table 1 provides examples of polymerization processes to make: (1) a low molecular weight plastomer, (2) a higher molecular weight elastomer, such as an ethylene-propylene-diene-rubber, and (3) a propylene-based polymer.

TABLE 1

Process Conditions of the Plant/Process in Varying Operating Modes

| Polymers Produced | Feed Into Reactor | Polymerization Inside Reactor | Polymer Solution Upstream Let-Down Valve | Polymer Solution Downstream Let-Down Valve | Polymer Lean Phase | Polymer Rich Phase |
|---|---|---|---|---|---|---|
| Plastomer | 50 or down to −15° C.; 120 bar total; 50 bar monomer | 130 to 200° C.; 100 to 130 bar; 7 to 22 wt % polymer | 220° C.; 100 to 130 bar; 15 to 22 wt % polymer | 22° C.; 30 to 45 bar; 15 to 22 wt % polymer | 220° C.; 30 to 45 bar; <0.3 wt % polymer | 220° C.; 30 to 40 bar; 25 to 40 wt % polymer |

TABLE 1-continued

Process Conditions of the Plant/Process in Varying Operating Modes

| Polymers Produced | Feed Into Reactor | Polymerization Inside Reactor | Polymer Solution Upstream Let-Down Valve | Polymer Solution Downstream Let-Down Valve | Polymer Lean Phase | Polymer Rich Phase |
|---|---|---|---|---|---|---|
| Elastomer | partial pressure 50 or down to −15° C.; 120 bar total; 50 bar monomer partial pressure | 85 to 150° C.; 100 to 130 bar; 8 to 15 wt % polymer | 220° C.; 100 to 130 bar; 8 to 15 wt % polymer | 220° C.; 30 to 45 bar; 8 to 15 wt % polymer | 22° C.; 30 to 45 bar; <0.3 wt % polymer | 220° C.; 30 to 40 bar; 25 to 40 wt % polymer |
| Propylene-based Polymer | 50 or down to −35° C.; 120 bar total; 50 bar monomer partial pressure | 50 or 80° C.; 100 to 130 bar; 5 to 15 wt % polymer | 200° C.; 100 to 130 bar; 5 to 15 wt % polymer | 200° C.; 30 to 45 bar; 5 to 15 wt % polymer | 200° C.; 30 to 45 bar; <0.3 wt % polymer | 220° C.; 30 to 40 bar; 20 to 40 wt % polymer |

With reference to FIG. 1 and Table 1, plastomers can be made using the processes described herein. For example, the temperature of the feed being introduced into the reactor (8) can be reduced by the chiller (6) to a temperature of 50° C. to −15° C., for example about 0° C. The pressure of the feed may be raised by the centrifugal pump (3) to about 120 bar. The feed comprising largely solvent and up to about 50 bar partial pressure of ethylene and a comonomer, such as for example butene, hexene, or octene, then enters the reactor (8) (or first of two series reactors if two reactors are used). Catalyst and activator is added to the reactor (8) in amounts to create the desired polymerization temperature which in turn is related to the desired molecular weight. The heat of polymerization increases the temperature to about 130° C. to 200° C., or about 150° C. to about 200° C. The plastomer may be formed with or without the use of hydrogen. At the outlet of the reactor (or the second reactor if two are used in series), the polymer concentration may be in the range of from 7 wt % to 22 wt %, or from 15 to 22 wt %. The heat exchanger (12) may be used to raise the temperature initially and then the further heat exchanger (16) may cause a further temperature rise to about 50° C. of the critical temperature. A rapid pressure drop results as the polymerization mixture passes through the let-down valve (18) into the liquid phase separator (14), with the pressure dropping quickly from about a pressure in the range of about 100 to 130 bar to a pressure in the range of about 30 to 45 bar. In some embodiments, the pressure differential between the outlet of the pump (3) and the outlet of the let-down valve (18) is solely responsible for causing the feed and the polymerization mixture to flow through the reactor (8) and the conduit (11) including the heat exchangers (12) and (16). Inside the separator (14) an upper lean phase is formed with less than about 0.3 wt % polymer, or less than about 0.1 wt % of polymer, and a lower polymer rich phase with about 25 to 40 wt % polymer, or from about 30 wt % to 40 wt % of polymer. Further removal of solvent and monomer from the polymer rich phase may occur in the low-pressure separator (34) and the extruder/devolatizer (40). Polymer can be removed from the plant containing less than 1 wt %, preferably with 0.3 wt % or less, even more preferably less than 0.1 wt % of volatiles, including water. Other general conditions for producing plastomers are described in WO 1997/22635 and WO 1999/45041.

With reference to FIG. 1 and Table 1, elastomers can be made using the processes described herein. As seen in Table 1, while the polymerization temperature may be lower for the production of elastomers than for plastomers, and the polymer concentration emerging from the reactor may also be lower (however the viscosity of the polymer concentration will be similar to that for plastomers), the same separation processes and plant can be used to produce elastomers as well as plastomers. Thus, the feed being introduced into the reactor may be at a temperature of 50° C. to −15° C., for example about 0° C. The pressure of the feed may be raised to about 120 bar. The feed comprising largely solvent and up to about 50 bar partial pressure of ethylene and comonomer, such as for example propylene and, optionally, diene, then enters the reactor (or first of two series reactors if two reactors are used). The heat of polymerization increases the temperature to about 85° C. to 150° C., or about 95° C. to about 130° C. At the outlet of the reactor (or the second reactor if two are used in series), the polymer concentration may be in the range of from 8 wt % to 15 wt %, or from 10 to 15 wt %. The heat exchanger (12) may be used to raise the temperature initially and then the further heat exchanger (16) may cause a further temperature rise to within 50° C. of the critical temperature. A rapid pressure drop results as the polymerization mixture passes through the let-down valve (18) into the liquid phase separator (14), with the pressure dropping quickly from about a pressure in the range of about 100 to 130 bar to a pressure within 50 psig of the critical temperature, such as a pressure in the range of about 30 to 45 bar. Inside the separator (14) an upper lean phase is formed with less than about 0.3 wt % polymer, or less than about 0.1 wt % of polymer, and a lower polymer rich phase with about 20 to 40 wt % polymer, or from about 30 wt % to 40 wt % of polymer. Polymer can be removed from the plant containing less than 1 wt %, preferably with 0.3 wt % or less, even more preferably less than 0.1 wt % of volatiles, including water. Other general conditions for producing elastomers using two reactors in series are described in WO 99/45047. Typically, in a series reactor process the first reactor may operate at temperatures between 0° C. to 110° C., or between 10° C. and 90° C., or between 20° C. and 79° C., and the second reactor may operate between 40° C. to 140° C., or between 50° C. to 120° C., or between 60° C. to 110° C.

Processes and conditions for producing propylene-based polymers are also found with reference to FIG. 1 and Table 1. General conditions for producing propylene-based polymers are also described in WO 00/01745. As compared to the processes described in Table 1 for producing plastomers and elastomers, the polymerization temperature when producing propylene-based polymers may be reduced and may vary between about 20° C. to about 80° C., or from about 28° C. to about 70° C., or from 50 to 80° C. Thus, the feed being introduced into the reactor may be at a temperature of 50° C. to −35° C., for example about 0° C. The pressure of the feed may be raised to about 120 bar. The feed comprising largely solvent and up to about 50 bar partial pressure of propylene and comonomer, such as for example ethylene and, optionally, diene, then enters the reactor (or reactors if two parallel reactors are used). The heat of polymerization increases the temperature to about 50° C. to 80° C., or about 55° C. to about 75° C. At the outlet of the reactor (or the second reactor if two are used in series), the polymer concentration may be in the range of from 5 wt % to 15 wt %, or from 7 to 12 wt %. The heat exchanger (12) may be used to raise the temperature initially and then the further heat exchanger (16) may cause a further temperature rise to within 50° C. of the critical temperature. A rapid pressure drop results as the polymerization mixture passes through the let-down valve (18) into the liquid phase separator (14), with the pressure dropping quickly from about a pressure in the range of about 100 to 130 bar to a pressure within 50 psig of the critical temperature, such as a pressure in the range of about 30 to 45 bar. Inside the separator (14) an upper lean phase is formed with less than about 0.3 wt % polymer, or less than about 0.1 wt % of polymer, and a lower polymer rich phase with about 20 to 40 wt % polymer, or from about 30 wt % to 40 wt % of polymer. Polymer can be removed from the plant containing less than 1 wt %, preferably with 0.3 wt % or less, even more preferably less than 0.1 wt % of volatiles, including water.

Catalyst

The processes described herein may use any catalyst system capable of polymerizing the monomers disclosed herein if that catalyst system is sufficiently active under the polymerization conditions disclosed herein. In preferred embodiments, the catalyst compound is a metallocene catalyst compound which may be part of a catalyst system.

As used herein, the term "catalyst system" means a catalyst precursor/activator pair. When "catalyst system" is used to describe such a pair before activation, it means the unactivated catalyst (pre-catalyst) together with an activator and, optionally, a co-activator. When it is used to describe such a pair after activation, it means the activated catalyst and the activator or other charge-balancing moiety. The transition metal compound may be neutral as in a pre-catalyst, or a charged species with a counter ion as in an activated catalyst system. The term "catalyst system" can also include more than one catalyst precursor and/or more than one activator and optionally a co-activator. Likewise, the term "catalyst system" can also include more than one activated catalyst and one or more activator or other charge-balancing moiety, and optionally a co-activator.

Catalyst precursor is also often referred to as pre-catalyst, catalyst, catalyst compound, transition (or lanthanide or actinide) metal compound or transition (or lanthanide or actinide) metal complex. These words are used interchangeably. Activator and co-catalyst (or co-catalyst) are also used interchangeably. A scavenger is a compound that is typically added to facilitate polymerization by scavenging impurities. Some scavengers may also act as activators and may be referred to as co-activators. A co-activator that is not a scavenger may also be used in conjunction with an activator in order to form an active catalyst. In some embodiments, a co-activator can be pre-mixed with the transition metal compound to form an alkylated transition metal compound.

An activator or co-catalyst is a compound or mixture of compounds capable of activating a pre-catalyst to form an activated catalyst. The activator can be a neutral compound (also called a neutral activator) such as tris-perfluorphenyl boron or tris-perfluorophenyl aluminum, or an ionic compound (also called a discrete ionic activator) such as dimethylanilinium tetrakis-perfluorophenyl borate or triphenylcarbonium tetrakis-perfluoronaphthyl borate. Activators of these types are also commonly referred to as non-coordinating anion activators (NCA activators) owing to the commonly held belief by those skilled in the art, that the reaction of the activator with the pre-catalyst forms a cationic metal complex and an anionic non-coordinating or weekly coordinating anion (NCA). Activators of these types that are discrete characterizable compounds by definition exclude alumoxane co-catalysts which are mixtures. The use of the term NCA is used as an adjective to describe the type of activator as in an NCA activator, or is used as a noun to describe the non-coordinating or weakly coordinating anion which is derived from the NCA activator.

Catalysts suitable for the polymer production process may generally contain a transition metal of groups 3 to 10 of the Periodic Table or a lanthanide or actinide metal, and at least one ancillary ligand that remains bonded to the transition metal during polymerization. The catalyst should preferably be selected from among a broad range of available catalysts known in the art to suit the type of polymer being made and the process window associated therewith in such a way that the polymer is produced under the process conditions at an activity of at least 40,000 g polymer per gram of the pre-catalyst (such as a metallocene pre-catalyst), preferably at least 60,000 or even in excess of 100,000 g polymer per g or the pre-catalyst.

Preferably, the catalyst is used in a cationic state and stabilized by a co-catalyst or activator. Especially preferred are group 4 metallocenes of (i.e., titanium, hafnium or zirconium) which typically exist during the polymerization in the $d^0$ mono-valent cationic state and bear one or two ancillary ligands. The important features of such catalysts for coordination polymerization is that the pre-catalyst comprises a ligand capable of abstraction and another ligand into which ethylene (or other olefin) can be inserted.

Preferred are metallocenes which are bis-cyclopentadienyl derivatives of a group 4 transition metal, preferably zirconium or hafnium. See WO 99/41294. These may advantageously be derivatives containing a fluorenyl ligand and a cyclopentadienyl ligand connected by a single carbon and silicon atom. See WO 99/45040 and WO 99/45041. Most preferably, the Cp ring is unsubstituted and/or the bridge contains alkyl substituents, suitably alkylsilyl substituents to assist in the alkane solubility of the metallocene. See WO 00/24792 and WO 00/24793. Other possible metallocenes include those in WO 01/58912. Other suitable metallocenes may be bis-fluorenyl derivatives or unbridged indenyl derivatives which may be substituted at one or more positions on the fused ruing with moieties which have the effect of increasing the molecular weight and so indirectly permit polymerization at higher temperatures, such as described in EP 6 93 506 and EP 7 80 395.

NCA activators (at times used in combination with a co-activator) may be used with the metallocene catalysts. Preferably, discrete ionic activators such as [Me$_2$PhNH] [B (C$_6$F$_5$)$_4$], [Ph$_3$C] [B(C$_6$F$_5$)$_4$], [Me$_2$PhNH] [B ((C$_6$H$_3$-3,5-(CF$_3$)$_2$))$_4$], [Ph$_3$C] [B((C$_6$H$_3$-3,5-CF$_3$)$_2$))$_4$], [NH$_4$] [B(C$_6$H$_5$)$_4$], [Me$_2$PhNH] [B(C$_{10}$F$_7$)$_4$], [Ph$_3$C] [B (C$_{10}$F$_7$)$_4$], or neutral activators such as B(C$_6$F$_5$)$_3$, B(C$_{10}$F$_7$)$_3$ or B(C$_6$H$_5$)$_3$ can be used (where C$_6$F$_5$ is prefluorophenyl, C$_{10}$F$_7$ is perfluoronaphthyl, C$_6$H$_3$-3,5-(CF$_3$)$_2$ is 3,5-bis(trifluoromethyl)phenyl). Preferred co-activators, when used, are alumoxanes such as methyl alumoxane, modified alumoxanes such as modified methyl alumoxane, and aluminum alkyls such as tri-isobutyl aluminum, and trimethyl aluminum.

It is within the scope of this invention to use one or more types of NCA activators, which may be neutral or ionic, such as tri (n-butyl) ammonium tetrakis (pentafluorophenyl) borate, a trisperfluorophenyl boron metalloid precursor or a trisperfluoronaphthyl boron metalloid precursor, polyhalogenated heteroborane anions (WO 98/43983), boric acid (U.S. Pat. No. 5,942,459).

Activated ionic catalysts can be prepared by reacting a transition metal compound (pre-catalyst) with a neutral activator, such as B(C$_6$F$_6$)$_3$, which upon reaction with the hydrolyzable ligand (X) of the transition metal compound forms an anion, such as ([B(C$_6$F$_5$)$_3$ (X)]$^-$, which stabilizes the cationic transition metal species generated by the reaction.

Examples of neutral NCA activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halo substituted) aryls, alkyls, and alkenyl compounds and mixtures thereof; preferred are alkenyl groups having 1-20 carbon atoms, alkyl groups having 1-20 carbon atoms, alkoxy groups having 1-20 carbon atoms, and aryl groups having 3-20 carbon atoms (including substituted aryls). More preferably, the three groups are alkyls having 1-4 carbon groups, phenyl, naphthyl or mixtures thereof. Even more preferably, the three groups are halogenated, preferably fluorinated, and aryl groups. Most preferably, the neutral NCA activator is trisperfluorophenyl boron or trisperfluoronaphthyl boron.

Descriptions of catalysts for coordination polymerization using metallocene cations activated by non-coordinating anions appear in EP-A-0 277 003, EP-A-0 277 004, WO92/00333, and U.S. Pat. Nos. 5,198,401 and 5,278,119, each of which can be herein incorporated by reference in their entirety. These references teach a preferred method of preparation wherein pre-catalysts such as a metallocene can be protonated by an anionic precursor such that an alkyl/hydride group is abstracted from a transition metal to make it both cationic and charge-balanced by the non-coordinating anion. The use of ionizing ionic compounds not containing an active proton but capable of producing both the active metallocene cation and a noncoordinating anion can be also known. See, e.g., EP-A-0 426 637, EP-A-0 573 403 and U.S. Pat. No. 5,387,568, each of which can be herein incorporated by reference in their entirety. Reactive cations other than Bronsted acids capable of ionizing the metallocene compounds include ferrocenium triphenylcarbonium and triethylsilylinium cations. Preferably, discrete ionic activators such as [Me$_2$PhNH] [B (C$_6$F$_5$)$_4$], [Ph$_3$C] [B(C$_6$F$_5$)$_4$], [Me$_2$PhNH] [B ((C$_6$H$_3$-3,5-(CF$_3$)$_2$))$_4$], [Ph$_3$C] [B((C$_6$H$_3$-3,5-CF$_3$)$_2$))$_4$], [NH$_4$] [B(C$_6$H$_5$)$_4$], [Me$_2$PhNH] [B(C$_{10}$F$_7$)$_4$], [Ph$_3$C] [B (C$_{10}$F$_7$)$_4$], [Me$_2$PhNH] [B(C$_{12}$F$_9$)$_4$], [Ph$_3$C] [B(C$_{12}$F$_9$)$_4$], or neutral activators such as B(C$_6$F$_5$)$_3$, B(C$_{10}$F$_7$)$_3$ or B(C$_6$H$_5$)$_3$ can be used (where C$_6$F$_5$ is prefluorophenyl, C$_{10}$F$_7$ is perfluoronaphthyl, C$_6$H$_3$-3,5-(CF$_3$)$_2$ is 3,5-bis(trifluoromethyl)phenyl, C$_{12}$F$_9$ is perfluorobiphenyl).

Elastomers

As described above, the processes described herein may be used to form elastomers, such as terpolymers comprising ethylene, an alpha-olefin and a diene, also referred to as EODE (Ethylene-alpha-Olefin-Diene Elastomer) of high Mw and greater than 0.3 weight % diene content, preferably greater than 2.0 weight % diene content. These polymers may be largely amorphous and have a low or zero heat of fusion. As used herein the term "EODE" encompasses elastomeric polymers comprised of ethylene, an alpha-olefin, and one or more non-conjugated diene monomers. The non-conjugated diene monomer can be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4 -hexadiene; 3,7-dimethyl-1,6-octadiene; 3,7 -dimethyl-1,7 -octadiene and mixed isomers of dihydromyricene and dihydroocinene; single ring alicyclic dienes such as 1,4-cyclohexadiene; and 1,5-cyclododecadiene; and multi-ring alicyclic fused and bridged ring dienes such as tetrahydroindene, methyl tetrahydroindene, dicyclopentadiene; 5-ethylidene-bicyclo(2,2,1)hept-2-ene alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

In a preferred embodiment, the polymer being produced in the polymer production process is an ethylene-propylene rubber. Preferably, the polymer is an ethylene-propylene-diene rubber (EPDM). In a preferred embodiment, the plasticized polymer is an ethylene-propylene-diene rubber containing 10-100 phr of a plasticizer. As used herein, "phr" refers to parts per hundred of plasticizer ratioed to the neat polymer. In one preferred embodiment, the ethylene-propylene-diene rubber contains about 15 to about 100 phr (about 13 to about 50 wt %) of a plasticizer, preferably a plasticizer a Group I or Group II paraffinic oil (e.g., Sunpar 150, Chevron Paramount 6001).

Of the dienes typically used to prepare EPDMs, the particularly preferred dienes are, 1,4-hexadiene (HD), 5-ethylidene-2-norbornene (Ethylidene Norbornene, ENB), 5-vinylidene- 2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). The preferred EOD elastomers may contain 20 up to 90 weight % ethylene, more preferably 30 to 85 weight % ethylene, most preferably 35 to 80 weight % ethylene. The alpha-olefin suitable for use in the preparation of elastomers with ethylene and dienes are preferably propylene, 1-butene, 1-pentene, 1-hexene, 1-octene and 1-dodecene. The alpha-olefin is generally incorporated into the EODE polymer at 10 to 80 wt %, or 20 to 65 wt %. The non-conjugated dienes are generally incorporated into the EODE at 0.5 to 20 to 35 wt %; or 1 to 15 wt %, or at 2 to 12 wt %. If desired, more than one diene may be incorporated simultaneously, for example HD and ENB, with total diene incorporation within the limits specified above.

Propylene-based Polymers

As described above, the processes described herein may be used to form propylene-based polymers, such as one or more propylene-based elastomers ("PBEs"). The PBE comprises propylene and from about 5 to about 30 wt % of one or more alpha-olefin derived units, preferably ethylene and/or $C_4$-$C_{12}$ α-olefins. For example, the alpha-olefin derived units, or comonomer, may be ethylene, butene, pentene, hexene, 4-methyl-1-pentene, octene, or decene. In preferred embodiments, the comonomer is ethylene. In some embodiments, the PBE consists essentially of propylene and ethylene, or consists only of propylene and ethylene. Some of the embodiments described below are discussed with reference to ethylene as the comonomer, but the embodiments are equally applicable to PBEs with other α-olefin comonomers. In this regard, the copolymers may simply be referred to as propylene-based elastomers with reference to ethylene as the α-olefin.

The PBE may include at least about 5 wt %, at least about 6 wt %, at least about 7 wt %, at least about 8 wt %, at least about 9 wt %, at least about 10 wt %, at least about 12 wt %, or at least about 15 wt %, α-olefin-derived units, where the percentage by weight is based upon the total weight of the propylene-derived and α-olefin-derived units. The PBE may include up to about 30 wt %, up to about 25 wt %, up to about 22 wt %, up to about 20 wt %, up to about 19 wt %, up to about 18 wt %, or up to about 17 wt %, α-olefin-derived units, where the percentage by weight is based upon the total weight of the propylene-derived and α-olefin-derived units. In some embodiments, the PBE may comprise from about 5 wt % to about 30 wt %, from about 6 wt % to about 25 wt %, from about 7 wt % to about 20 wt %, from about 10 wt % to about 19 wt %, from about 12 wt % to about 18 wt %, or from about 15 wt % to about 17 wt %, α-olefin-derived units, where the percentage by weight is based upon the total weight of the propylene-derived and α-olefin-derived units.

The PBE may include at least about 70 wt %, at least about 75 wt %, at least about 78 wt %, at least about 80 wt %, at least about 81 wt %, at least about 82 wt %, or at least about 83 wt %, propylene-derived units, where the percentage by weight is based upon the total weight of the propylene-derived and α-olefin derived units. The PBE may include up to about 95 wt %, up to about 94 wt %, up to about 93 wt %, up to about 92 wt %, up to about 91 wt %, up to about 90 wt %, up to about 88 wt %, or up to about 85 wt %, propylene-derived units, where the percentage by weight is based upon the total weight of the propylene-derived and α-olefin derived units.

The PBEs may be characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. The Tm of the PBE (as determined by DSC) may be less than about 120° C., less than about 115° C., less than about 110° C., or less than about 105° C.

The PBE may be characterized by its heat of fusion (Hf), as determined by DSC. The PBE may have an Hf that is at least about 0.5 J/g, at least about 1.0 J/g, at least about 1.5 J/g, at least about 3.0 J/g, at least about 4.0 J/g, at least about 5.0 J/g, at least about 6.0 J/g, or at least about 7.0 J/g. The PBE may be characterized by an Hf of less than about 75 J/g, or less than about 70 J/g, or less than about 60 J/g, or less than about 50 J/g.

As used within this specification, DSC procedures for determining Tm and Hf are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 minutes. Then a second cool-heat cycle is performed, where the sample is again cooled to about −30° C. to about −50° C. and held for 10 minutes at that temperature, and then re-heated at 10° C./min to a final temperature of about 200° C. Events from both cycles are recorded. The thermal output is recorded as the area under the melting peak of the sample, which typically occurs between about 0° C. and about 200° C. It is measured in Joules and is a measure of the Hf of the polymer.

The PBE can have a triad tacticity of three propylene units (mmm tacticity), as measured by $^{13}C$ NMR, of 75 % or greater, 80 % or greater, 85 % or greater, 90 % or greater, 92 % or greater, 95 % or greater, or 97 % or greater. For example, the triad tacticity may range from about 75 to about 99 %, from about 80 to about 99 %, from about 85 to about 99 %, from about 90 to about 99 %, from about 90 to about 97 %, or from about 80 to about 97 %. Triad tacticity may be determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}C$ nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso, and "r" to racemic. An m/r ratio of 1.0 generally describes a syndiotactic polymer, and an m/r ratio of 2.0 describes an atactic material.

The PBE may have a percent crystallinity of from about 0.5 % to about 40 %, from about 1 % to about 30 %, or from about 5 % to about 25 %, determined according to DSC procedures. Crystallinity may be determined by dividing the Hf of a sample by the Hf of a 100 % crystalline polymer, which is assumed to be 189 J/g for isotactic polypropylene.

The PBE may have a density of from about 0.84 g/cm$^3$ to about 0.92 g/cm$^3$, from about 0.85 g/cm$^3$ to about 0.90 g/cm$^3$, or from about 0.85 g/cm$^3$ to about 0.87 g/cm$^3$ at room temperature, as measured per the ASTM D-1505 test method.

The PBE can have a melt index (MI) (ASTM D- 1238, 2.16 kg @190° C.), of less than or equal to about 100 g/10 min, less than or equal to about 50 g/10 min, less than or equal to about 25 g/10 min, less than or equal to about 10 g/10 min, less than or equal to about 8.0 g/10 min, less than or equal to about 5.0 g/10 min, or less than or equal to about 3.0 g/10 min.

The PBE may have a melt flow rate (MFR), as measured according to ASTM D- 1238 (2.16 kg weight @230° C.), greater than about 0.5 g/10 min, greater than about 1.0 g/ 10 min, greater than about 1.5 g/10 min, greater than about 2.0 g/10 min, or greater than about 2.5 g/10 min. The PBE may have an MFR less than about 100 g/10 min, less than about 50 g/10 min, less than about 25 g/10 min, less than about 15 g/10 min, less than about 10 g/10 min, less than about 7 g/10 min, or less than about 5 g/10 min. In some embodiments, the PBE may have an MFR from about 0.5 to about 10 g/10 min, from about 1.0 to about 7 g/10 min, or from about 1.5 to about 5 g/10 min.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where ηb is the intrinsic viscosity of the polymer and ηl is the intrinsic viscosity of a linear polymer of the same viscosity-averaged molecular weight (Mv) as the polymer. ηl=KMvα, K and α are measured values for linear polymers and should be obtained on the same instrument as the one used for the g' index measurement.

The PBE may have a weight average molecular weight (Mw), as measured by DRI, of from about 50,000 to about 1,000,000 g/mol, or from about 75,000 to about 500,000 g/mol, from about 100,000 to about 350,000 g/mol, from about 125,000 to about 300,000 g/mol, from about 150,000 to about 275,000 g/mol, or from about 200,000 to about 250,000 g/mol.

The PBE may have a number average molecular weight (Mn), as measured by

DRI, of from about 5,000 to about 500,000 g/mol, from about 10,000 to about 300,000 g/mol, from about 50,000 to about 250,000 g/mol, from about 75,000 to about 200,000 g/mol, or from about 100,000 to about 150,000 g/mol.

The PBE may have a z-average molecular weight (Mz), as measured by MALLS, of from about 50,000 to about 1,000,000 g/mol, from about 75,000 to about 500,000 g/mol, or from about 100,000 to about 400,000 g/mol, from about 200,000 to about 375,000 g/mol, or from about 250,000 to about 350,000 g/mol.

The molecular weight distribution (MWD, equal to Mw/Mn) of the PBE may be from about 0.5 to about 20, from about 0.75 to about 10, from about 1.0 to about 5, from about 1.5 to about 4, or from about 1.8 to about 3.

Optionally, the PBE may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene- 2-norbornene (ENB); 1,4-hexadiene; 5-methylene-2-norbornene (MNB); 1,6-octadiene; 5-methyl- 1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based elastomer composition comprises a diene, the diene may be present at from 0.05 wt % to about 6 wt %, from about 0.1 wt % to about 5.0 wt %, from about 0.25 wt % to about 3.0 wt %, from about 0.5 wt % to about 1.5 wt %, diene-derived units, where the percentage by weight is based upon the total weight of the propylene-derived, α-olefin derived, and diene-derived units.

Optionally, the PBE may be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, or acrylates. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene- 2,3-dicarboxylic acid anhydride, 1,2,3,4,5,8,9,10-octahydronaphthalene-2,3-dicarboxylic acid anhydride, 2-oxa-1,3-diketospiro(4.4) nonene, bicyclo(2.2.1)heptene-2,3-dicarboxylic acid anhydride, maleopimaric acid, tetrahydrophthalic anhydride, norbornene- 2,3 -dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In embodiments wherein the graft monomer is maleic anhydride, the maleic anhydride concentration in the grafted polymer is preferably in the range of about 1 to about 6 wt %, at least about 0.5 wt %, or at least about 1.5 wt %.

In some embodiments, the PBE is a reactor blended polymer. That is, the PBE is a reactor blend of a first polymer component made in a first solution polymerization reactor and a second polymer component made in a second solution polymerization reactor, where the solution polymerization reactors are in a parallel configuration as described with reference to FIG. 1. Thus, the comonomer content of the propylene-based elastomer can be adjusted by adjusting the comonomer content of the first polymer component, adjusting the comonomer content of second polymer component, and/or adjusting the ratio of the first polymer component to the second polymer component present in the PBE.

In embodiments where the PBE is a reactor blended polymer, the α-olefin content of the first polymer component ("R₁") may be greater than 5 wt % α-olefin, greater than 7 wt % α-olefin, greater than 10 wt % α-olefin, greater than 12 wt % α-olefin, greater than 15 wt % α-olefin, or greater than 17 wt % α-olefin, where the percentage by weight is based upon the total weight of the propylene-derived and α-olefin-derived units of the first polymer component. The α-olefin content of the first polymer component may be less than 30 wt % α-olefin, less than 27 wt % α-olefin, less than 25 wt % α-olefin, less than 22 wt % α-olefin, less than 20 wt % α-olefin, or less than 19 wt % α-olefin, where the percentage by weight is based upon the total weight of the propylene-derived and α-olefin-derived units of the first polymer component. In some embodiments, the α-olefin content of the first polymer component may range from 5 wt % to 30 wt % α-olefin, from 7 wt % to 27 wt % α-olefin, from 10 wt % to 25 wt % α-olefin, from 12 wt % to 22 wt % α-olefin, from 15 wt % to 20 wt % α-olefin, or from 17 wt % to 19 wt % α-olefin. Preferably, the first polymer component comprises propylene and ethylene, and in some embodiments the first polymer component consists only of propylene and ethylene derived units.

In embodiments where the PBE is a reactor blended polymer, the α-olefin content of the second polymer component ("$R_2$") may be greater than 1.0 wt % α-olefin, greater than 1.5 wt % α-olefin, greater than 2.0 wt % α-olefin, greater than 2.5 wt % α-olefin, greater than 2.75 wt % α-olefin, or greater than 3.0 wt % α-olefin, where the percentage by weight is based upon the total weight of the propylene-derived and α-olefin-derived units of the second polymer component. The α-olefin content of the second polymer component may be less than 10 wt % α-olefin, less than 9 wt % α-olefin, less than 8 wt % α-olefin, less than 7 wt % α-olefin, less than 6 wt % α-olefin, or less than 5 wt % α-olefin, where the percentage by weight is based upon the total weight of the propylene-derived and α-olefin-derived units of the second polymer component. In some embodiments, the α-olefin content of the second polymer component may range from 1.0 wt % to 10 wt % α-olefin, or from 1.5 wt % to 9 wt % α-olefin, or from 2.0 wt % to 8 wt % α-olefin, or from 2.5 wt % to 7 wt % α-olefin, or from 2.75 wt % to 6 wt % α-olefin, or from 3 wt % to 5 wt % α-olefin. Preferably, the second polymer component comprises propylene and ethylene, and in some embodiments the first polymer component consists only of propylene and ethylene derived units.

In embodiments where the PBE is a reactor blended polymer, the PBE may comprise from 1 to 25 wt % of the second polymer component, from 3 to 20 wt % of the second polymer component, from 5 to 18 wt % of the second polymer component, from 7 to 15 wt % of the second polymer component, or from 8 to 12 wt % of the second polymer component, based on the weight of the propylene-based elastomer. The PBE may comprise from 75 to 99 wt % of the first polymer component, from 80 to 97 wt % of the first polymer component, from 85 to 93 wt % of the first polymer component, or from 82 to 92 wt % of the first polymer component, based on the weight of the propylene-based elastomer.

Lower Critical Solution Temperature Separation

As described above, the separation processes described herein use the LCST phenomena to separate the polymer solution exiting the polymerization reactor into a polymer-rich phase and a polymer-lean phase. That is, the liquid-liquid separator operates on the principle of lower critical solution temperature (LCST) phase separation. This technique uses the thermodynamic principle of spinodal decomposition to generate two liquid phases; one substantially free of polymer and the other containing the dissolved polymer at a higher concentration than the polymerization reactor effluent that is fed to the separator.

Figure 2:
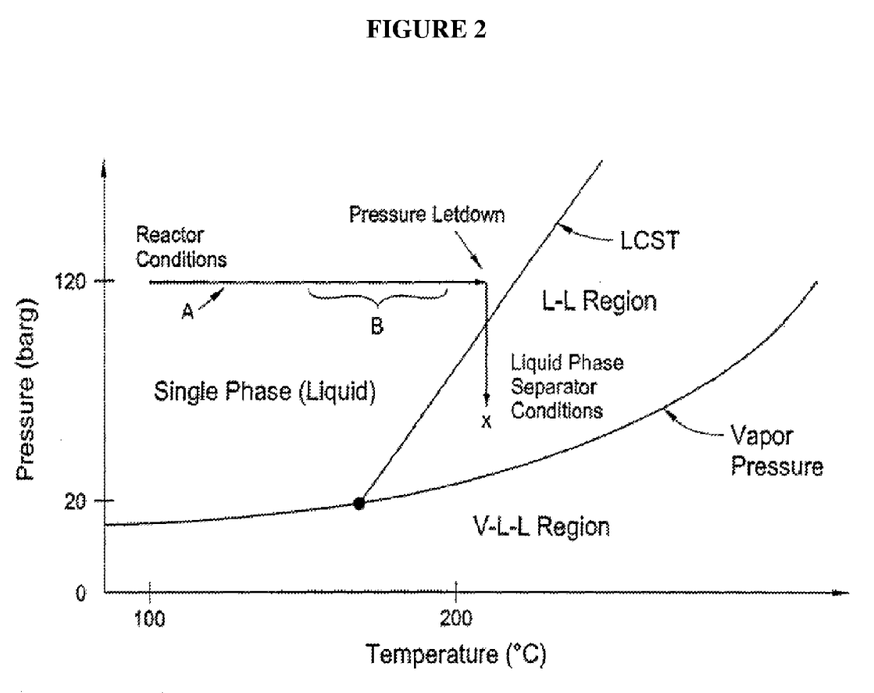
FIG. 2 is a phase diagram illustrating the operation of a liquid phase separator.

Liquid phase separation of the polymerization reactor effluent by passing through the LCST boundary is described with reference to FIG. 2. In this illustrative example, the polymerization reaction takes place at 100 or 120 bar in the polymerization reactor(s) at the pressure also prevailing upstream of the pressure letdown device at a level as shown by line A in FIG. 2. The temperature is maintained and/or raised to a range marked by the bracket shown at B to between 150 and 200 or 220° C. At the prevailing temperature, the pressure is dropped along the arrow to a level marked X. As the temperature is dropped across the letdown valve from 100 bar to 40 bar, the polymerization mixture passes from a homogenous single phase, through the LCST boundary, to a two phase liquid-liquid (L-L) region. That is, for a given temperature, the pressure starts at a pressure above the highest of the pressure-temperature curves representing the upper critical solution temperature (UCST), the LCST, and the vapor pressure, and the pressure after the let-down for the given temperature is below the pressure-temperature curve representing the spinodal boundary and above the pressure-temperature curve representing the vapor pressure. The pressure drop is sufficiently fast to avoid formation of a continuous polymer and to form a discontinuous solvent/monomer phase. The pressure drop across the region bounded by the LCST (bimodal) boundary and the spinodal boundary must be especially rapid to induce phase separation by spinodal decomposition, which leads to rapid phase separation and settling.

Level X is above another phase boundary marked Vapor pressure below which the mixture enters a vapor-liquid-liquid (V-L-L) region in which it is part vapor, and part two phase liquid. The pressure at level X at the exit of the separator is sufficiently high so that no vapor is formed.

While the general process of the LCST separation is described above, the effectiveness of the separation has been found to be a function of solvent type, polymer solution composition, temperature, and pressure. The LCST separation is premised on there being a difference in the rate of volumetric expansion between the solvent and polymer in the solution. Therefore, as the solution is isobarically heated or as the solution is adiabatically depressurized, the solvent expands to a much greater extent than the dissolved polymer causing a sudden molar expansion which results in the spontaneous formation of two distinct liquid-liquid phases. The sharpness of the separation depends on the quickness and depth of the transition. As such, the temperature to which the polymer solution is heated to and/or the pressure to which the polymer solution is let-down to effect the effectiveness of the separation. It is important that there be complete separation of the phases, as entrainment of excess polymer in the polymer-lean phase can create fouling and/or plugging of the recycle in the polymerization plant. Likewise, if the polymer-rich phase contains excess polymer solvent it can become difficult to completely devolatizer and recover the polymer product.

The methods described herein can be used to optimize the separation within the separator by monitoring in an on-line fashion the process conditions of the polymerization reactor, including the polymer/solvent concentration in the polymer solution effluent exiting the reactor, and actively adjusting the temperature to which the polymerization reactor effluent is heated to and/or adjusting the amount of pressure letdown. Therefore, the method describe herein generally comprises (a) polymerizing one or more monomers and comonomers in the presence of a solvent in a polymerization reactor to produce a polymer solution comprising solvent, polymer, and unreacted monomer and comonomer; (b) determining the composition of the polymer solution exiting the polymerization reactor in an on-line fashion; (c) determining at least one of the critical pressure or critical temperature of the polymer solution; (d) comparing the critical pressure and/or critical temperature to the actual temperature of the polymer solution and the actual pressure of the polymer solution; (e) heating or cooling the polymer solution to a temperature within 50° C. of the critical temperature; (f) passing the polymer solution through a pressure letdown valve into a liquid-liquid separator, where the pressure of the polymer solution is reduced or raised to a pressure within 50 psig of the critical pressure to induce a separation of the polymer solution into two liquid phases, a polymer-rich phase and a polymer-lean phase; (g) recovering the polymer-rich phase from the liquid-liquid separator; (h) devolatizing the polymer-rich phase to recover polymer.

The polymerization of the one or more monomers and comonomers in the presence of a solvent in a polymerization reactor to produce a polymer solution may occur as described above, and with reference to FIG. 1 and Table 1. In some preferred embodiments, the monomer is ethylene and the comonomer comprises propylene and, optionally, diene, and the polymer is an ethylene-propylene rubber or an ethylene-propylene-diene rubber. In some preferred embodiments, the monomer is propylene and the comonomer comprises ethylene and, optionally, diene, and the polymer is a propylene-based polymer, such as a propylene-based elastomer. In preferred embodiments, the polymerization reactor is a solution polymerization reactor.

The composition of the polymer solution exiting the polymerization reactor is determined in an on-line fashion. Thus, the polymer solution exiting the polymerization reactor is analyzed and monitored in an on-line fashion to determine the composition of the solution, that is, the amount (solvent concentration or mass fraction) of solvent, polymer, and unreacted monomer in the solution. Changes in the polymer solution are continuously monitored in an on-line fashion, such that the data may be collected at least once every hour, at least once every forty-five minutes, at least once every thirty minutes, at least once every twenty minutes, at least once every ten minutes, or at least once every five minutes. The composition of the polymer solution may be detected by one or more analyzers, such as an H2 analyzer, a water analyzer, a gas chromatography analyzer, and/or a Raman analyzer. In preferred embodiments, a gas chromatography analyzer or Raman analyzer are used to measure the monomers and inerts in the solvent. For example, the gas chromatography analyzer or Raman analyzer may be used to measure the amount of unreacted ethylene, propylene, and/or diene, in the solvent. In some embodiments, the one or more analyzers maybe placed at the exit of the polymerization reactor.

The critical pressure and/or critical temperature of the polymer solution are determined utilizing the on-line data collected as described above. That is the critical pressure and critical temperature of the polymer solution can be determined utilizing equations of state (EOS) that model the lower-critical solution temperature separation phenomena. For example, the model used may apply the Heidemann-Khalil formulation for solution criticality which uses a cubic equation of state (Peng-Robinson or Soave-Redlich-Kwong) model to predict the critical pressure of the polymer solution.

Heidemann-Khalil Formulation for Solution Criticality $$Q \cdot \Delta n = 0 \quad Q_{ij} = A_{ij} = \left(\frac{\partial^2 A}{\partial n_i \partial n_j}\right)$$

$$\sum_{i=1}^{C}\sum_{j=1}^{C}\sum_{k=1}^{C} A_{ijk} \Delta n_i \Delta n_j \Delta n_k = 0$$

$$\Delta n^T \cdot \Delta n - 1 = 0 \quad A_{ijk} = \left(\frac{\partial^3 A}{\partial n_i \partial n_j \partial n_k}\right)$$

The multiple non-linear equations can then be solved simultaneously utilizing the Newton-Raphson method. The Newton-Raphson method is further described in "Reliable Computation of Mixture Critical Points," Stradi, 1999.

Thus, the critical temperature and pressure may be determined by solving n+2 equations, where n is the number of components representing the molar change of each component, and +2 represents the critical temperature and critical volume. Thus, for example, when determining the critical pressure and critical temperature of a polymer solution comprising solvent, an ethylene-propylene-diene rubber, and unreacted monomer and comonomer, there are five components (n=5) (the solvent, the rubber, unreacted ethylene, unreacted propylene, and unreacted diene) giving 7 equations. The results of the seven equations are used to back calculate the critical pressure from the equations of state. For example, when determining the critical temperature and/or pressure of a polymer solution for an EPDM polymer, the EOS that may be applied is the Soave-Redlich/Kwong model with binary interaction coefficients, where the coefficients for the components can be obtained from literature. The Newton-Raphson method for global convergence can then be used to solve iteratively and simultaneously the n+2 equations. The global convergence process is described in more detail in "Numerical Recipes in FORTRAN," 2$^{nd}$ edition, Chapter 9, Section 7. A line search and backtracking method can be used to adjust the step-size of the Newton-Raphson method for global convergence. Partial derivatives can be calculated by finite differences versus the analytical solution.

One assumption of the model is that the solvent in the polymer-lean phase is compositionally similar to the polymer solution leaving the reactor just without the polymer. This assumption can be verified by additionally measuring the composition of the polymer-lean phase utilizing process analyzers such as an H2 analyzer, a water analyzer, a gas chromatography analyzer, and/or a Raman analyzer as described above.

The actual temperature of the polymer solution may be measured by thermocouple or other appropriate means at the outlet of the reactor or at the entrance to the heat exchange.

If the actual temperature of the polymer solution is less than the critical temperature, the polymer solution exiting the polymerization reactor is then heated to a temperature within 50° C. of the critical temperature. For example, the polymer solution may be heated to a temperature within 45° C., or within 40° C., or within 30° C., or within 25° C., or within 20° C., or within 15° C., or within 12° C., or within 10° C., or within 7° C., or within 5° C., or within 2° C. of the critical temperature. In preferred embodiments, the polymer solution is heated to a temperature that is less than the critical temperature, so as to minimize fouling on the tube walls of the heat exchanger. With reference to FIG. 1, the polymer solution may first be heated in the heat exchanger (12). In some embodiments, the trim heater (16) may be used to further heat the polymer solution.

After being heated, the pressure of the polymer solution may be adjusted by the pressure letdown valve (18). The actual pressure of the polymer solution may be measured by pressure gauge at the exit of the heat exchanger, or trim heat exchange, or entrance to the pressure letdown value. Thus, after passing through the pressure letdown valve, the polymer solution enters the liquid-liquid separator, where the drop in pressure causes a phase separation into two liquid phases, the polymer-rich phase and the polymer-lean phase. The pressure of the polymer solution may be letdown to a pressure that is within 50 psig, or within 45 psig, or within 40 psig, or within 35 psig, or within 30 psig, or within 25 psig, or within 20 psig, of the critical pressure. In some embodiments, the pressure within the liquid-liquid separator is controlled to be about 50 psig greater than the critical pressure, or about 40 psig, greater than the critical pressure, or about 35 psig greater than the critical pressure, or about 30 psig greater than the critical pressure.

In some embodiments, the efficiency of the separation may also be improved by controlling the position of the interface between the polymer-rich phase and the polymer-lean phase within the liquid-liquid separator. The position of the interface may be detected by sonic detectors or nuclear-density gauges as described above.

The separation processes described herein can allow for more efficient LCST separation in solution polymerization processes. Utilizing real-time on-line data to determine the critical pressure and temperature can allow for maximization of the pressure drop of the polymer solution when entering the liquid-liquid separator without running the risk of forming a third vapor phase. More efficient separation can in turn reduce fouling in the recycle lines, and thus increase the time the polymerization plant can run without running defouling procedures. Additionally, more efficient separation can allow for increased polymerization rates through the polymerization plant.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A method for continuous solution polymerization comprising:
   (a) polymerizing one or more monomers and comonomers in the presence of a solvent in a polymerization reactor to produce a polymer solution comprising solvent, polymer, and unreacted monomer and comonomer;
   (b) determining the composition of the polymer solution exiting the polymerization reactor in an on-line fashion;
   (c) determining the critical pressure and critical temperature of the polymer solution;
   (d) comparing the critical temperature to the actual temperature of the polymer solution and heating or cooling the polymer solution to a temperature within 50° C. of the critical temperature;
   (e) comparing the critical pressure to the actual pressure of the polymer solution and passing the polymer solution through a pressure letdown valve into a liquid-liquid separator, where the pressure of the polymer solution is reduced or raised to a pressure within 50 psig of the critical pressure to induce a separation of the polymer solution into two liquid phases, a polymer-rich phase and a polymer-lean phase;
   (f) recovering the polymer-rich phase from the liquid-liquid separator;
   (g) devolatizing the polymer-rich phase to obtain polymer.

2. The method of claim 1, wherein the polymerization reactor is a solution polymerization reactor.

3. The method of claim 1, where the monomer is ethylene and the comonomer comprises propylene and, optionally, diene.

4. The method of claim 1, wherein the polymer that is obtained is an ethylene-propylene-diene rubber or a propylene-based elastomer.

5. The method of claim 1, wherein the composition of the polymer solution exiting the polymerization reactor is determined at least once every hour.

6. The method of claim 1, wherein the composition of the polymer solution exiting the polymerization reactor is determined at least once very twenty minutes.

7. The method of claim 1, where determining the composition of the polymer solution exiting the polymerization reactor comprises utilizing a gas chromatography analyzer or a Raman analyzer to measure the molar fraction of the solvent, unreacted monomer, unreacted comonomer, and polymer in the polymer solution.

8. The method of claim 1, wherein the critical pressure and critical temperature are determined utilizing the Heidermann-Khalil formulation of solution criticality which utilizes the Peng-Robinson or Soave-Redlich-Kwong equations of state.

9. The method of claim 1, wherein the polymer solution is heated to a temperature that is less than the critical temperature.

10. The method of claim 1, comprising heating the polymer solution to a temperature that is within 10° C. of the critical temperature.

11. The method of claim 1, comprising reducing the polymer solution to a pressure that is within 20 psig of the critical pressure.

12. The method of claim 1, wherein the polymer solution comprises 5 to 15 wt % of polymer as it exits the polymerization reactor.

13. The method of claim 1, wherein the polymer-lean phase comprises less than 0.3 wt % of polymer.

14. The method of claim 1, wherein the polymer rich phase comprises 20 to 40 wt % of polymer.

* * * * *